United States Patent [19]
Kaneko et al.

[11] Patent Number: 5,726,970
[45] Date of Patent: Mar. 10, 1998

[54] MULTI-LAYER OPTICAL RECORDING MEDIUM

[75] Inventors: Masahiko Kaneko, Kanagawa; Ariyoshi Nakaoki, Tokyo; Tetsuhiro Sakamoto, Chiba, all of Japan

[73] Assignee: Sony Corporation, Japan

[21] Appl. No.: 615,965

[22] Filed: Mar. 14, 1995

[30] Foreign Application Priority Data

Mar. 20, 1995 [JP] Japan .................. 7-060645

[51] Int. Cl.$^6$ .................. G11B 7/24; G11B 3/74
[52] U.S. Cl. .................. 369/275.2; 369/94
[58] Field of Search .................. 369/275.1–275.5, 369/13, 94

[56] References Cited

U.S. PATENT DOCUMENTS

| | | | |
|---|---|---|---|
| 3,946,367 | 3/1976 | Wohlmut et al. | 369/275.1 |
| 4,219,704 | 8/1980 | Russell | 369/275.3 |
| 5,202,875 | 4/1993 | Rosen et al. | 369/275.2 |
| 5,373,499 | 12/1994 | Imaino et al. | 369/275.1 |
| 5,479,382 | 12/1995 | Nishida et al. | 369/275.1 |
| 5,479,394 | 12/1995 | Yashima et al. | 369/275.1 |
| 5,511,057 | 4/1996 | Holtslag et al. | 369/275.1 |
| 5,540,966 | 7/1996 | Hintz | 369/275.1 |
| 5,555,537 | 9/1996 | Imaino et al. | 369/275.1 |
| 5,563,873 | 10/1996 | Ito et al. | 369/275.1 |
| 5,608,715 | 3/1997 | Yokogawa et al. | 369/275.1 |

FOREIGN PATENT DOCUMENTS 63-276732  11/1988  Japan.

OTHER PUBLICATIONS

W.I. Imaino et al., "Extending the Compact Disk Format to High Capacity for Video Applications," Proc. SPIE vol. 2338, Optical Data Storage, (1994) pp. 254–259.

K.A. Rubin et al., "Multilevel Volumetric Optical Storage," Proc. SPIE vol. 2338, Optical Data Storage, Dana Point, (1994) pp. 247–253.

*Primary Examiner*—Nabil Hindi
*Attorney, Agent, or Firm*—Ronald P. Kananen

[57] ABSTRACT

A novel multi-layer optical disc according to the present invention can treat a large volume of information without deterioration in level of reproduction signals from the respective information storage layers thereof. The multi-layer optical disc comprises a substrate having a light-transmission property, a read-only-memory type information storage portion formed on the substrate, a semi-transmission layer disposed on the read-only-memory type information storage portion, a spacer layer disposed on the semi-transmission layer and having a light-transmission property, and a rewritable information storage layer disposed on said spacer layer.

20 Claims, 1 Drawing Sheet

MULTI-LAYER OPTICAL RECORDING MEDIUM

BACKGROUND OF THE INVENTION

1. Field of the Invention

This invention relates to a multi-layer optical recording medium, and more particularly to a novel multi-layer optical disc having a plurality of information recording layers from which information signals are optically read out, and capable of treating a large volume of information data.

2. Prior Art

In association with recent progress in so-called multimedia, there has been an increasing demand for treating a large volume of information data such as digital animation. To this end, it is required to provide a means capable of storing a large volume of information and reproducing the stored information, if desired, in a random access manner.

It is known that an optical disc is a recording medium having excellent features such as a capability of random access to information stored thereon, a mass information storage, or facilitated loading and unloading operations in a recording/reproducing apparatus. Such features permit a large number of the optical discs to be utilized in a wide variety of application fields. However, in order to satisfy the aforementioned requirements for realizing the mass information storage, a larger volume of information must be stored on one surface of the optical disc as compared with those of the conventional optical disc.

Under this circumstance, attempts have been made to provide multiple information storage layers in the thickness direction of the optical disc as one measure for increasing its information storage capacity.

As is known in the art, in the multi-layer optical disc, a plurality of information storage layers are formed on one surface of the optical disc and information signals stored on the respective information storage layers are read by changing a focal distance of a read light for each information storage layer, whereby a large volume of information can be treated without losing a capability of random access to the information.

Typical multi-layer optical discs hitherto reported include:

(1) optical discs of a type in which information stored thereon is reproduced by changing a focal distance of read light (For example, as disclosed in U.S. Pat. No. 3,948,387);

(2) optical discs of a type in which a plurality of information layers are provided on one surface thereof in an overlapped manner and information signals on the respective information layers are read by a permeable or reflecting light (For example, as disclosed in U.S. Pat. No. 4,219,704); and (3) optical discs of a type from which information signals stored thereon are read by using an optical reproducing system having a aberration correcting function (For example, as disclosed in U.S. Pat. No. 5,202,875).

Meanwhile, optical discs are generally classified into three major types including read-only-memory (ROM) type optical discs, write-once type optical discs and rewritable or direct-read-after-write type optical discs. Specific examples of the conventionally proposed multi-layer optical discs include two-layer read-only-memory type optical discs (W. Imai, H. J. Rosen, K. A. Rubin, T. S. Strand, and M. E. Best, "Proc. SPIE" vol. 2338, "Optical Data Storage, Dana Point," (1994), pp. 254–259), two-layer write-once type optical discs (K. A. Rubin, H. J. Rosen, W. W. Tang, W. Imai, and T. C. Strand, "Proc. SPIE," vol. 2338, "Optical Data Storage, Dana Point," (1994), pp 247–253).

All the conventional two-layer optical discs provide a first information storage layer disposed closely to a substrate and made of a dielectric material or a semi-permeable material having a relatively high transmittance to a light such as dye. The two-layer optical discs are so designed that a reflectance R1 of a reflected light from the first information storage layer is almost identical to a final reflectance $T1^2R2$ of a reflected light from a second information storage layer. Incidentally, T1 denotes a transmittance of the first information storage layer and R2 denotes a reflectance of the second information storage layer.

In addition, Japanese patent application laid-open publication No. 63-276,732 (1988) discloses one example of the multi-layer optical disc in which first and second information storage layers are both formed as rewritable layers.

However, in the event that the first and second information storage layers are rewritable layers, an absorbance of the first information storage layer is larger than that of the second information storage layer so that a sufficient reflectance of a reflected light from the second information storage layer cannot be assured. As a result, there occurs a problem that the information signals stored on the respective layers cannot be reproduced as a whole in an accurate and sufficient manner. Therefore, the optical discs of such a type cannot meet a practical requirements.

OBJECT AND SUMMARY OF THE INVENTION

It is therefore an object of the present invention to provide a novel multi-layer optical disc of a rewritable type capable of reproducing signals stored on the respective information storage layers thereof in a sufficient level and treating a large volume of information.

As a result of intense studies and investigations made by the present inventors, it has been found that, when a read-only-memory (ROM) type information storage layer having a high light-transmittance is provided on a transparent substrate and a rewritable information storage layer is provided on the ROM layer through a spacer layer, almost identical reflectances of the respective information storage layers can be obtained and the reflectances are practically usable for reproduction of the information signals stored thereon. The present invention has been accomplished by the aforementioned finding.

In a first aspect of the present invention, there is provided a multi-layer optical disc comprising a substrate having a light-transmission property, a read-only-memory type information storage portion formed on the substrate, a semi-transmission layer disposed on the read-only-memory type information storage portion, a spacer layer disposed on the semi-transmission layer and having a light-transmission property, and a rewritable information storage layer disposed on said spacer layer.

Generally, in the rewritable multi-layer optical discs, if two or more rewritable layers are provided on the same one surface of the optical disc, it is difficult to assure a satisfactory reflectance of a rewritable layer disposed remote from a substrate, for example the second rewritable layer, so that the optical disc has an insufficient reproduction performance as a whole.

As described above, the multi-layer optical disc according to the present invention is provided with the first information storage layer of a read-only-memory (ROM) type having a light-transmission property. In consequence, a light-transmittance thereof can be assured so that the reflectance of the second information storage layer, which is of a rewritable type, can be retained in a sufficient level.

Accordingly, it is possible to realize formation of the first and second information storage layers both having a practically usable reflectance whereby sufficient signal levels can be obtained from the respective information storage layers.

Further, since information can be written on the optical disc in both read-only and rewritable manners, a mass information storage can be realized so that such a multi-layer optical disc can be used in a further wide variety of application fields.

These and other objects, features and advantages of the present invention will become more apparently from the following detailed description when read in conjunction with the accompanying drawings and the appended claims.

BRIEF DESCRIPTION OF THE DRAWINGS

For a better understanding of the present invention, reference is made to a detailed description to be read in conjunction with the accompanying drawings in which.

DETAILED DESCRIPTION OF THE PREFERRED EMBODIMENTS

Figure 1:
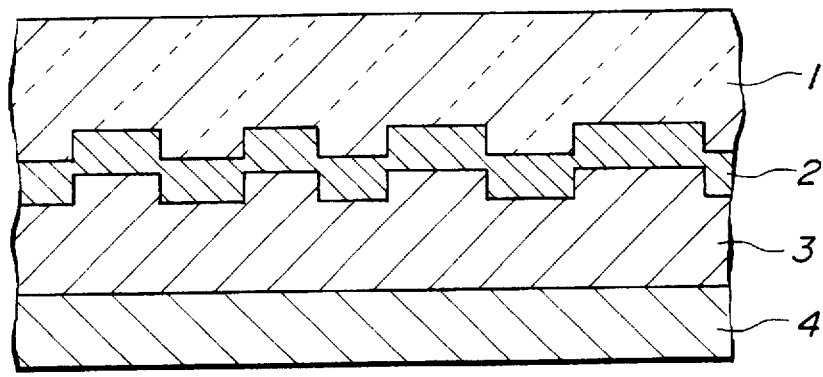
FIG. 1 is a sectional view schematically showing a multi-layer optical disc according to a first embodiment of the present invention.

Referring now to FIG. 1, there is shown a multi-layer optical disc according to a first embodiment of the present invention. The multi-layer optical disc in turn is composed of a substrate 1, a first information storage layer 2, a spacer layer 3 and a second information storage layer 4.

The substrate 1 may be made of, for example, polycarbonate or glass. The polycarbonate substrate 1 may be produced by using an injection-molding method while the glass substrate 1 may be produced by using a so-called 2P method. In this case, an irregular pattern such as recording pits can be formed on a surface of the substrate 1 to store a read-only-memory type information data.

The first information storage layer 2 may be deposited along the irregular pattern on the surface of the substrate 1. The first information storage layer 2 functions not only as a read-only-memory type information storage layer but also as a reflecting layer for reading out the read-only-memory type information data stored in the form of the irregular pattern.

The first information storage layer 2 may be made of, for example, a dielectric material such as silicon nitride (SiN), silicon, or a material capable of exhibiting a transmittance to some extent such as a dye having a relatively low absorbance. However, these materials themselves are required to exhibit a reflectance to a wave length of a read light to some extent.

The spacer layer 3 serves for optically separating the first and second information storage layers 2 and 4. In consequence, the spacer layer 3 should have a thickness sufficient to optically separate them from each other. Specifically, it is preferred that the thickness of the spacer layer 3 is 30 μm or more. When the thickness of the spacer layer 3 is too small, the reflected light from the first information storage 2 layer cannot be sufficiently separated from that from the second information storage layer 4 so that an accurate detection of the information data cannot be carried out. On the other hand, when the thickness of the spacer layer 3 is too large, undesirable spherical aberration occurs. In view of these deficiencies, the thickness of the spacer layer 3 should be adjusted to a proper level.

Moreover, the second information storage layer 4 formed on the first information storage layer 2 through the spacer layer 3 is made of a material capable of rewriting an information thereon. Typical examples of the preferred materials for the second information storage layer 4 may include a phase-changing material such as a chalcogen compound, e.g., GeSbTe, a magneto-optical material such as a rare earth-transition metal, e.g., TbFeCo, or the like.

The second information storage layer 4 can be optionally written by the user.

Figure 2:
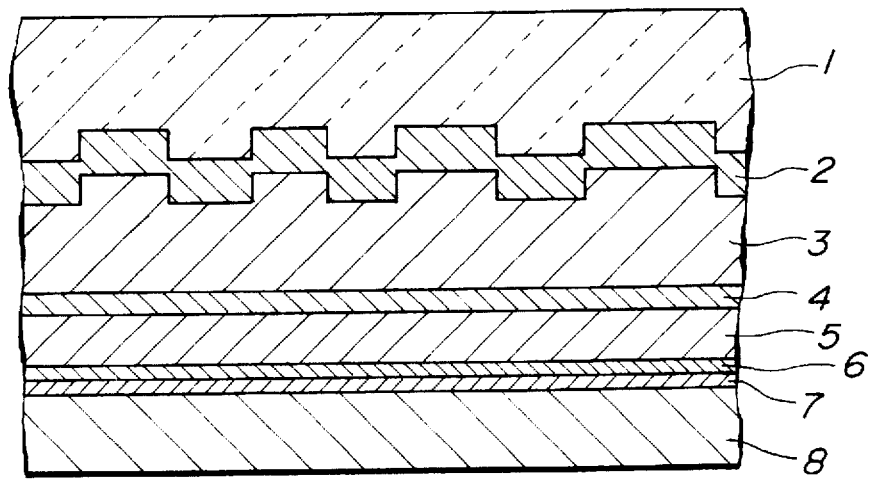
FIG. 2 is a sectional view schematically showing a multi-layer optical disc according to a second embodiment of the present invention.

In the event that the second information storage layer 4 is made of, for example, the magneto-optical material, an enhancing layer or a reflecting layer is provided if desired. FIG. 2 shows a multi-layer optical disc of such a type provided with the enhancing layer or the reflecting layer, according the second embodiment of the present invention. In the multi-layer optical disc shown in FIG. 2, there are provided transparent dielectric films serving as enhancing layers 5 and 6. The enhancing layers 5 and 6 are disposed on opposite sides of the second information storage layer 4 and made of silicon nitride (SiN) or the like. The multi-layer optical disc further has the reflecting layer 7 and a protective layer 8. The provision of the enhancing layers 5 and 6 enables an increase of the Kerr rotation angle upon reproduction of magneto-optical signals. As a result, a detection accuracy of the magneto-optical signals is improved.

In such an arrangement of the multi-layer optical disc, it is required that the first and second information storage layers 2 and 4 have given reflectances to a wave length of the read light. Especially, in order to enhance a signal-to-noise ratio (S/N ratio) of the information signal, it is important to assure the reflectance of the second information storage layer 4. However, the reflectance of the first information storage layer 2 as the read-only-memory type information storage layer may be in a relatively low level as compared with that of the second information storage layer 4.

The aforementioned multi-layer optical disc can store not only the information of the read-only-memory type but also the information of the rewritable type so that a large volume of information can be treated at one time. The information stored on the respective information storage layers 2 and 4 can be read by changing a focal distance of the read light and irradiating the read light on the respective information storage layers 2 and 4.

Preparation of Multi-Layer Optical Disc

In a the preparation of the aforementioned multi-layer optical disc, the substrate 1 is first produced. The substrate 1 is provided on a surface thereof with an irregular pattern in the form of pits which correspond to the first information signals as a read-only memory type information to be recorded. The substrate 1 may be made of glass or plastic resins such as polycarbonate. In case that the substrate 1 is made of glass, a photo-setting resin is filled between the glass substrate 1 and a disc stamper and cured by irradiating a light from a back side of the glass substrate 1. This method is referred to as a Photo-Polymerization method (2P method) by which a signal pattern of the disc stamper is transferred to a surface of a layer made of the photo-setting resin. As a result, the photo-setting resin layer having the irregular pattern thereon is formed integrally with the glass substrate. When the substrate 1 is made of a plastic resin material, the irregular pattern of the plastic substrate 1 may be produced by the 2P method similarly to the case of the glass substrate.

However, the irregular pattern of the plastic substrate 1 is generally produced by an injection-molding method using a disc stamper.

Next, the substrate 1 having the irregular pattern is subjected to a vacuum deposition method or a sputtering method to deposit a silicon nitride (SiN) film having a given thickness or the like thereon. In this case, a material which exhibits a relatively low absorbance, such as dye, can be used instead of silicon nitride for the formation of the film layer.

The thus-prepared film layer serves as the first information storage layer 2 which is a read-only-memory type information storage layer. Successively, the spacer layer 3 is formed on the first information storage layer 2. The spacer layer 3 is required to have an adequate thickness, for example, 30 μm or more. Such a spacer layer 3 may be produced, for example, by spin-coating an ultra-violet curing resin or the like to form a single layer on the first information storage layer 2. Alternatively, the spacer layer 3 may be in the form of a laminate prepared by repeatedly coating a plurality of ultra-violet curing resin layers each having a thickness of about 5 μm to about 10 μm. Moreover, the spacer layer 3 may be prepared by adhering a transparent film on the first information storage layer 2.

In the event that the spacer layer 3 is formed with a guide groove for controlling positions of the information to be recorded on the second information storage layer 4, the guide groove can be produced by using the 2P method in a similar manner to the case of irregular pattern such as pits formed on the substrate 1.

After completion of the formation of the spacer layer 3, the second information storage layer 4 is formed on the spacer layer 3. The second information storage layer 4 may be in the form of a rewritable layer, for example, made of a phase-changeable material. In this case, the second information storage layer 4 can be produced by subjecting the phase-changeable material such as, typically a chalcogen Compound, e.g., GeSbTc to a vacuum deposition method or a sputtering method. In the event that the second information storage layer 4 is made of a magneto-optical material, the second information storage layer 4 can be also produced by subjecting the magneto-optical material such as, typically a rare earth-transition metal, e.g., TbFeCo to a vacuum deposition method or a sputtering method.

In either case, the transparent dielectric film layers 5 and 6 made of a transparent dielectric material such as silicon nitride (SiN) and the reflecting layer 7 made of metal such as Al can be formed at adequate layer position of the optical disc, if desired. The transparent dielectric layers 5 and 6 can serve as an enhancing layer. In addition, the protective layer 8 made of an ultra-violet curing resin or the like may be formed to protect an outer surface of the optical disc from being damaged.

EXAMPLES

The present invention is described in more detail by way of examples but these examples are only illustrative and not intended to constitute a limitation to the scope of the present invention.

Example 1

A phase-changeable material (GeSbTe) was used as a rewritable material to form the second information storage layer 4 so that a multi-layer optical disc having such a structure as shown in FIG. 2 was obtained.

In the preparation of the multi-layer optical disc, the first information storage layer 2 was formed from silicon nitride (SiN) and the substrate 1 was formed from polycarbonate by using an injection-molding method. The spacer layer 3 was in the form of a spin-coated layer made of an ultra-violet curing resin and having a thickness of 40 μm. The enhancing layers 5 and 6 were made of ZnS or $SiO_2$ while the reflecting layer 7 was made of aluminum. These constructions and materials for the respective layers are used throughout the examples of the present invention. Incidentally, recording and reproducing of information was performed by using a semiconductor laser having a wave length of 690 nm.

The thus-prepared multi-layer optical disc was formed with the first information storage layer 2 made of silicon nitride (SiN) and having a thickness $t_1$ of 90 nm. As a result of measurements, it was confirmed that a reflectance $R_1$ of the first information storage layer 2 was 8% and a transmittance $T_1$ thereof was 92%.

Whereas, when a reflectance $R_2$ of the second information storage layer 4 is set to 40% a final reflectance $T_1^2 R_2$ of a reflected light beam from the second information storage layer 4 was 34%. It was confirmed that the final reflectance was in a sufficient level.

Accordingly, it was found that both a read-only memory type information signals and a rewritable signals could be sufficiently reproduced from the first and second information storage layers 2 and 4, respectively.

Example 2

The procedure of Example 1 was repeated in the same manner as described above except that the first information storage layer 2 was made of silicon (Si).

When the first information storage layer 2 was made of silicon (Si) and had a thickness $t_1$ of 16 nm, it was confirmed that the reflectance $R_1$ of the first information storage layer 2 was 23% and a transmittance $T_1$ thereof was 77%.

Whereas, when a reflectance $R_2$ of the second information storage layer 4 is set to 40%, a final reflectance $T_1^2 R_2$ of a reflected light beam from the second information storage layer 4 was 24%. Further, it was confirmed that the reflectance $R_1$ of the reflected light from the first information storage layer 2 was approximately identical to the reflectance $R_2$ of the reflected light from the second information storage layer 4. Both the reflectance $R_1$ and $R_2$ from the first and second information storage layers 2 and 4 were in a sufficient level.

Example 3

A magneto-optical material (TbFeCo) was used as a rewritable material to form the second information storage layer 4 so that a multi-layer optical disc having such a structure as shown in FIG. 2 was obtained.

In the preparation of the multi-layer optical disc, the first information storage layer 2 was formed from silicon nitride (SiN) and the substrate 1 was formed from polycarbonate by using an injection-molding method. The spacer layer 3 was in the form of a spin-coated layer made of an ultra-violet curing resin and having a thickness of 40 μm. The enhancing layers 5 and 6 were made of silicon nitride (SiN) while the reflecting layer 7 was made of aluminum.

When the multi-layer optical disc had a thickness $t_1$ of 90 nm, it was confirmed that a reflectance $R_1$ of the first information storage layer 2 was 8% and a transmittance $T_1$ thereof was 92%.

Whereas, when a reflectance $R_2$ of the second information storage layer 4 is set to 20% a final reflectance $T_1^2 R_2$ of a reflected light beam from the second information storage layer 4 was 17%. The final reflectance was in a sufficient level.

Example 4

The procedure of Example 3 was repeated in the same manner as described above except that the first information storage layer 2 was made of silicon (Si).

When the first information storage layer 2 was made of silicon (Si) and had a thickness $t_1$ of 12 nm, it was confirmed that the reflectance $R_1$ of the first information storage layer 2 was 15% and a transmittance $T_1$ thereof was 85%.

Whereas, when a reflectance $R_2$ of the second information storage layer 4 is set to 20% a final reflectance $T_1^2 R_2$ of a reflected light beam from the second information storage layer 4 was 15%. Further, it was confirmed that the reflectance $R_1$ from the first information storage layer 2 was approximately identical to the reflectance $R_2$ from the second information storage layer 4. Both the reflectance $R_1$ and $R_2$ from the first and second information storage layers 2 and 4 were in a sufficient level.

What is claimed is:

1. A multi-layer optical disc, comprising:
   a substrate having a light-transmission property;
   a read-only-memory type information storage portion formed on said substrate;
   a semi-transmission layer disposed on said read-only-memory type information storage portion;
   a spacer layer disposed on said semi-transmission layer and having a light-transmission property; and
   a rewritable information storage layer disposed on said spacer layer;
   wherein said spacer layer has a thickness of approximately 3 to 30 µm.

2. The multi-layer optical disc as claimed in claim 1, wherein said read-only-memory type information storage portion was formed from recessed pits.

3. The multi-layer optical disc as claimed in claim 1, wherein a final reflectance $T^2 R$ (where T and R represent a transmittance of said semi-transmission layer and a reflectance of said rewritable information storage layer, respectively) of a reflected light beam from said rewritable information storage layer, is approximately identical to a reflectance of said information storage portion.

4. The multi-layer optical disc as claimed in claim 1, said rewritable information storage layer is made of a magneto-optical material.

5. The multi-layer optical disc as claimed in claim 1, wherein said rewritable information storage layer is made of a phase-changeable material.

6. The multi-layer optical disc as claimed in claim 1, wherein said spacer layer is made of an ultra-violet curing resin.

7. The multi-layer optical disc as claimed in claim 1, wherein said semi-transmission layer is made of a silicon nitride.

8. A multi-layer optical disc as claimed in claim 1, wherein said spacer layer includes a guide groove for controlling the position of information to be recorded on or read from said rewritable information storage layer.

9. A multi-layer optical disc as claimed in claim 4, wherein said magneto-optical material is TbFeCo.

10. A multi-layer optical disc as claimed in claim 1, further comprising a reflecting layer formed on said rewritable information storage layer.

11. A multi-layer optical disc as claimed in claim 10, further comprising a protective layer formed on said reflecting layer.

12. A multi-layer optical disc as claimed in claim 1, further comprising dielectric enhancing layers formed on said rewritable information storage layer.

13. A multi-layer optical disc, comprising:
    a substrate having a light-transmission property;
    a read-only-memory type information storage portion formed on said substrate;
    a semi-transmission layer disposed on said read-only-memory type information storage portion;
    a spacer layer disposed on said semi-transmission layer and having a light-transmission property; and
    a rewritable information storage layer disposed on said spacer layer;
    wherein a reflectance of said semi-transmission layer is greater than a reflectance of said rewritable information storage layer.

14. The multi-layer optical disc as claimed in claim 13, wherein said spacer layer is approximately 3 to 30 µm thick.

15. The multi-layer optical disc as claimed in claim 13, wherein said spacer layer is at least 30 µm thick.

16. The multi-layer optical disc as claimed in claim 13, wherein said read-only-memory type information storage portion is formed from recessed pits.

17. A multi-layer optical disc, comprising:
    a substrate having a light-transmission property;
    a read-only-memory type information storage portion formed on said substrate;
    a semi-transmission layer disposed on said read-only-memory type information storage portion;
    a spacer layer disposed on said semi-transmission layer and having a light-transmission property; and
    a rewritable information storage layer disposed on said spacer layer;
    wherein said spacer layer includes a guide groove for controlling the position of information to be recorded on or read from said rewritable information storage layer.

18. A multi-layer optical disc as claimed in claim 17, wherein said spacer layer is approximately 3 to 30 µm thick.

19. A multi-layer optical disc as claimed in claim 17, wherein a reflectance of said semi-transmission layer is greater than a reflectance of said rewritable information storage layer.

20. The multi-layer optical disc as claimed in claim 1, wherein a reflectance of said semi-transmission layer is greater than a reflectance of said rewritable information storage layer.

* * * * *